No. 667,177. Patented Feb. 5, 1901.
S. E. BALL.
MACHINE FOR MIXING AND COOLING CONFECTIONERY.
(Application filed May 31, 1900.)
(No Model.) 2 Sheets—Sheet 1.

WITNESSES:
Carl H. Noe
C. Theobald.

S. E. Ball,
INVENTOR.
By R. J. McCarty
his ATTORNEY.

THE NORRIS PETERS CO., PHOTO-LITHO., WASHINGTON, D. C.

No. 667,177. Patented Feb. 5, 1901.
S. E. BALL.
MACHINE FOR MIXING AND COOLING CONFECTIONERY.
(Application filed May 31, 1900.)
(No Model.) 2 Sheets—Sheet 2.

Witnesses:
Carl Stine.
C. Theobald.

Samuel E. Ball,
Inventor.
By R. J. McCarty,
his Attorney.

UNITED STATES PATENT OFFICE.

SAMUEL E. BALL, OF DAYTON, OHIO.

MACHINE FOR MIXING AND COOLING CONFECTIONERY.

SPECIFICATION forming part of Letters Patent No. 667,177, dated February 5, 1901.

Application filed May 31, 1900. Serial No. 18,500. (No model.)

*To all whom it may concern:*

Be it known that I, SAMUEL E. BALL, a citizen of the United States, residing at Dayton, in the county of Montgomery and State of Ohio, have invented certain new and useful Improvements in Machines for Cooling and Mixing Fondants; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in machines for mixing and cooling candy-cream for chocolate-creams, bonbons, &c. In the preparation of the candy cream or stock for this class of confectionery it is desirable in order to obtain the cream or fondant in a fine, smooth, and velvety condition that it be cooled rapidly and at the same time agitated or mixed thoroughly. The sugar is boiled to a certain consistency and is then placed in the vessel and is rapidly reduced to a cold state before it is agitated. Unless the material is cooled rapidly it goes through a process of crystallization and is rendered unsuitable for the production of this class of confectionery, and the longer the material is permitted to hold the heat the more rapid is the formation of crystals. To obtain the desired results, I use a circular shallow receptacle, the bottom of which is surrounded by a water-jacket, and owing to the shallowness of said receptacle the top of the material or stock contained therein is enabled to come in contact with the air, which will have the effect of cooling the upper portion of the material as it is being agitated. The agitating-blades are so constructed and arranged that the entire body of the stock is constantly moved in and out from the center of the receptacle in such a manner that the necessary agitation is given said stock, as will be hereinafter more fully described in the specification and pointed out in the claims.

Figure 2:
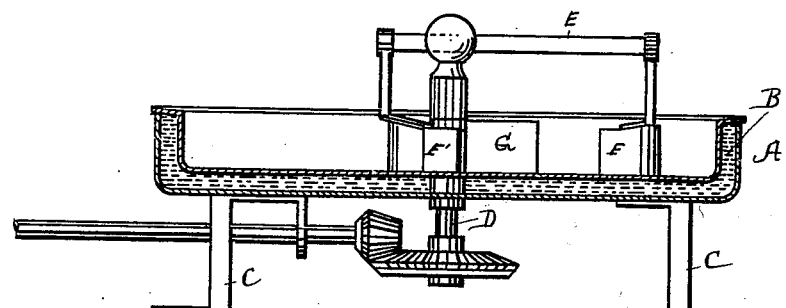
Figure 1:
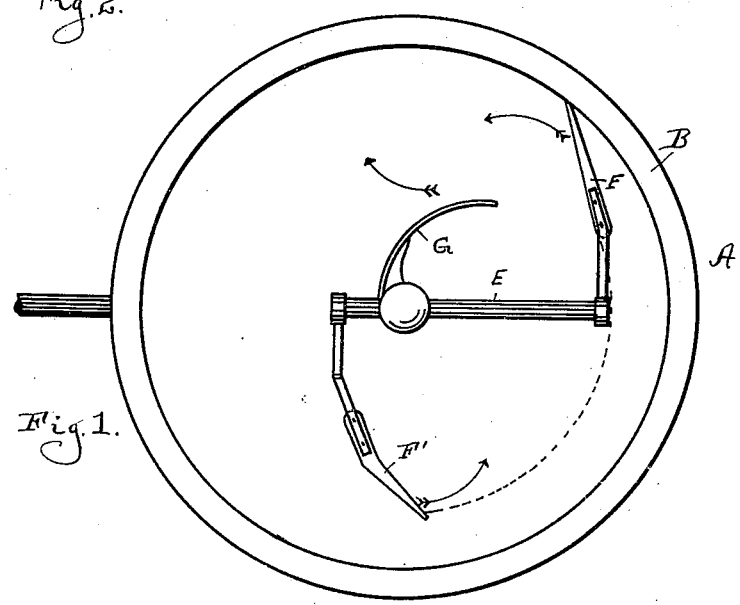
Figure 3:
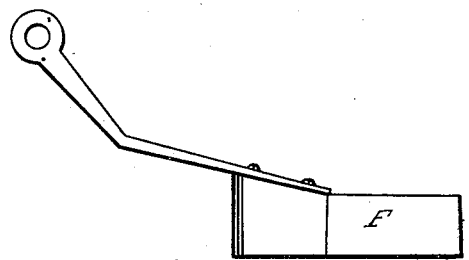
Figure 4:
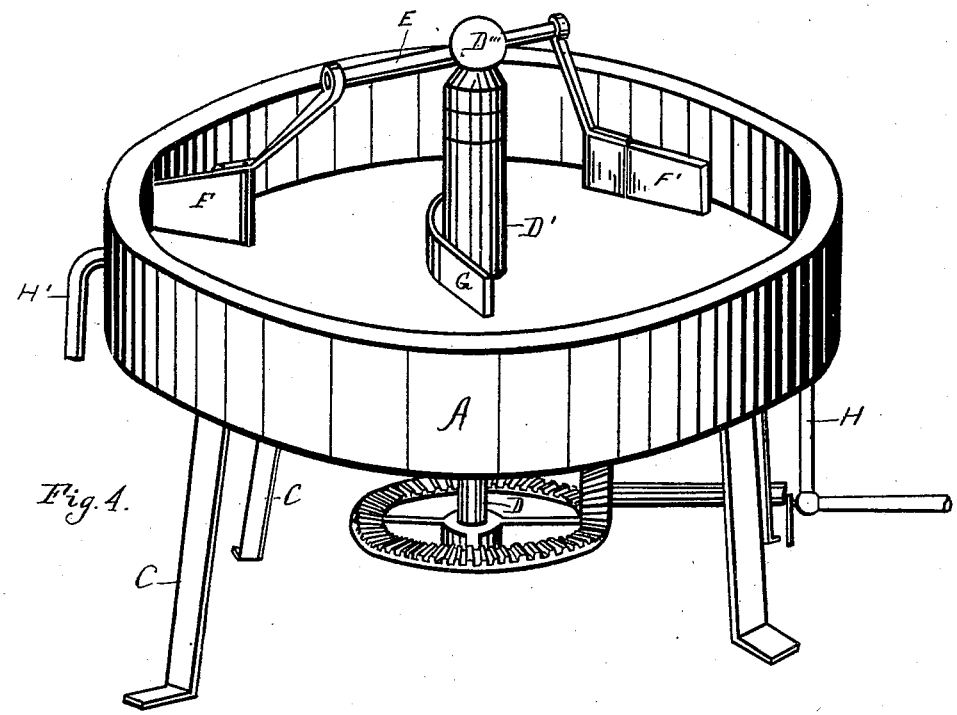
Figure 5:
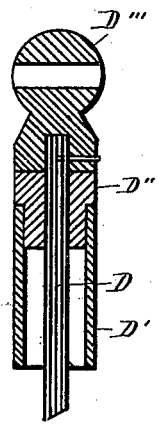

Referring to the accompanying drawings, Figure 1 is a top plan view of my invention. Fig. 2 is a vertical sectional view. Fig. 3 is an elevation of one of the blades. Fig. 4 is a perspective view of the machine complete. Fig. 5 is an enlarged vertical sectional view of the bearings for the shafts.

The letter A represents a round shallow vessel in which the boiled material or stock for the formation of the fondant is placed. This vessel is surrounded throughout its sides and bottom with a water-jacket B, into and out of which cool water is made to constantly circulate. The shallowness of this receptacle is an essential feature of its construction, as it is important that the stock be submitted to the cooling effect of not only the water-jacket, but also the atmosphere. This receptacle is suitably mounted on legs C C and has a central upright shaft D, which is driven through gearing from any source of power. The shaft D passes through a sleeve D', which is stationary, having a water-tight connection with the bottom of the receptacle. D'' is a plug upon the upper end of said sleeve. The shaft D passes through said sleeve and plug and into the head D''', to which it is secured, so that the head D''' will turn with the shaft D. Secured to the head D''' is a horizontal shaft E. One end of said shaft E occupies a position adjacent to the rim of the receptacle, while the other end of said shaft is nearer the central shaft or the axis of the receptacle. There are placed on the ends of this horizontal shaft two stirrers or agitating-blades F and F', which project a considerable distance from the ends of the horizontal shaft and partake of the angles or curvatures substantially as shown in Fig. 1. It will be noted from the length of these blades that a substantial body of the stock is carried around thereby and is released gradually at the end. The outermost one of said blades sweeps the stock inwardly from the inner periphery of the vessel, while the innermost one of said blades takes the stock on a line with the rear end of the outermost blade, as is shown in dotted lines, Fig. 2.

G designates an inner blade which is attached directly to the central shaft. This blade in its rotation with the shaft and the other blades throws the stock out to a position to meet the outermost blade F in the rotation of said blade. Owing to the arrangement and construction of these several blades the stock is thoroughly agitated in a comparatively few rotations of the blades. As shown in Fig. 3, these blades have a depth which is substantially equal to the depth of the vessel, so that in the rotation of said blades the entire body of the stock is carried around and a new surface in each rotation is made to present itself both to the water-jacket portion of the vessel and to the atmosphere. This is an important feature in the construction of the machine, as it is necessary that the stock be cooled rapidly while it is being agitated, as hereinbefore specified.

H designates an inlet-pipe projecting into the bottom of the receptacle and through which water is introduced to the water-jacket, and H' is a similar pipe communicating with the upper portion of said receptacle and through which an outlet for the water is provided.

Having described my invention, I desire to secure by Letters Patent—

1. The herein-described machine for cooling and stirring candy-stock, the combination with a shallow vessel, having a water-jacket surrounding its bottom and sides, an upright shaft projecting through the center of said vessel, a horizontal shaft mounted above the vessel, the point of attachment of said horizontal shaft with the upright shaft being nearer one end of said horizontal shaft, mixing-blades mounted on the ends of said horizontal shaft, the outer one of said mixing-blades being adapted to sweep the stock from the inner periphery of the vessel, and the innermost one of said blades being adapted to sweep the stock which is left by the outer blade, an inner blade attached to said upright shaft and being adapted to sweep the stock from the center of the vessel outward to the path of the two outer blades, substantially as shown and for the purposes specified.

2. In a machine for cooling and mixing fondants, the combination with a shallow vessel, the bottom and sides of which are surrounded by a water-jacket, an upright driving-shaft passing through the center of said vessel, a horizontal shaft carried on the upper end of said shaft, the point of attachment of said horizontal shaft with the upright shaft being adjacent to one end of said horizontal shaft, elongated mixing-blades mounted on the ends of said horizontal shaft, one of said blades being adapted to scrape the inner periphery of the vessel, and the other one of said blades being adapted to describe a circle which coincides with the circle described by the inner end of the outer one of said blades whereby the stock is agitated by said blades from the inner periphery of the vessel, to a point adjacent to the axis of the vessel, and an inner blade attached to the upright shaft, the curvature of which is concentric to said upright shaft, the inner blade being adapted to sweep the stock from the axis of the vessel outwardly in the path of the two outer blades, substantially as shown and for the purposes specified.

In testimony whereof I affix my signature in presence of two witnesses.

SAMUEL E. BALL.

Witnesses:
R. J. McCARTY,
C. H. NOE.